Feb. 25, 1941.  W. L. KAUFFMAN 2D  2,233,387
WRINGER
Filed July 1, 1937  2 Sheets-Sheet 1
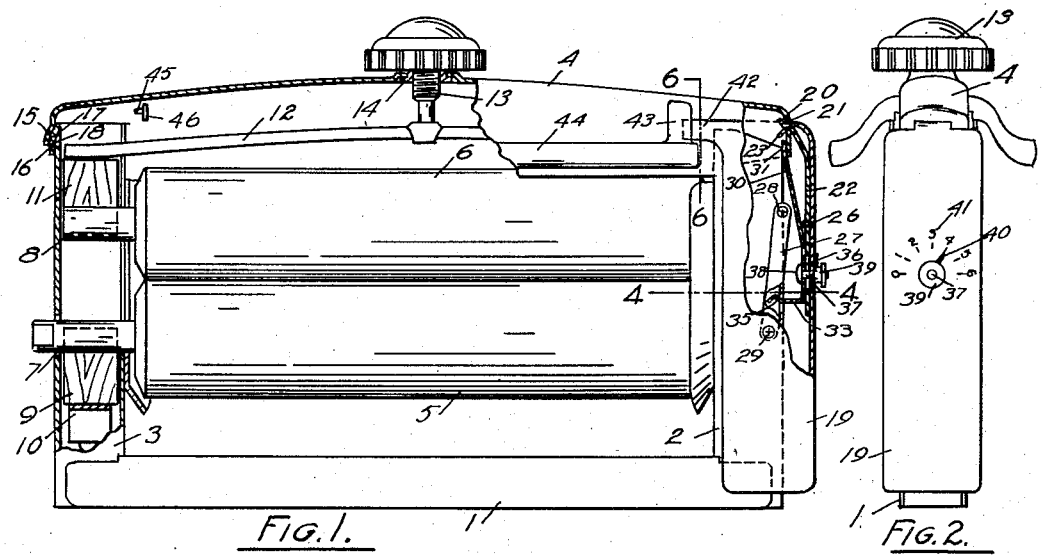
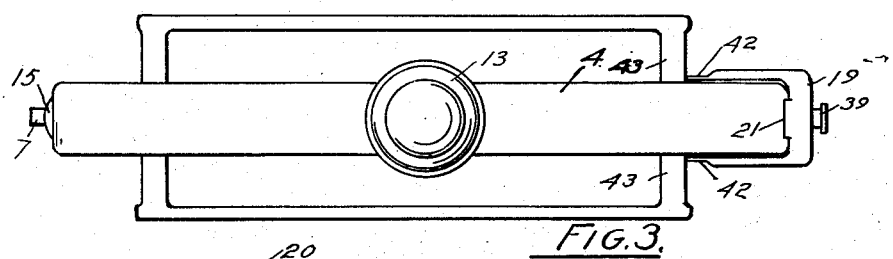
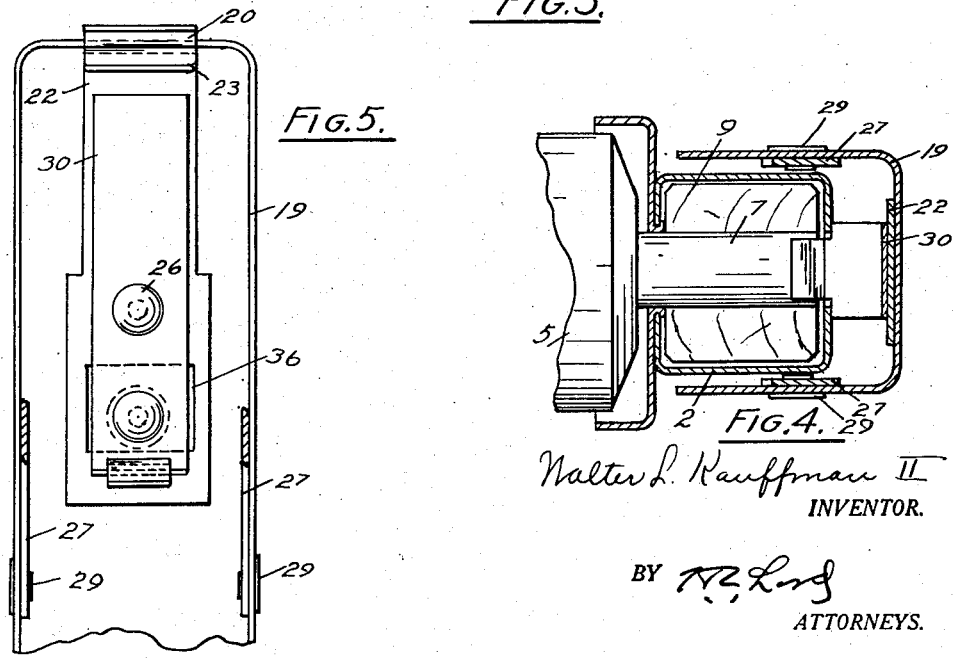
Walter L. Kauffman II
INVENTOR.
BY
ATTORNEYS.

Feb. 25, 1941. W. L. KAUFFMAN 2D 2,233,387
WRINGER
Filed July 1, 1937 2 Sheets-Sheet 2
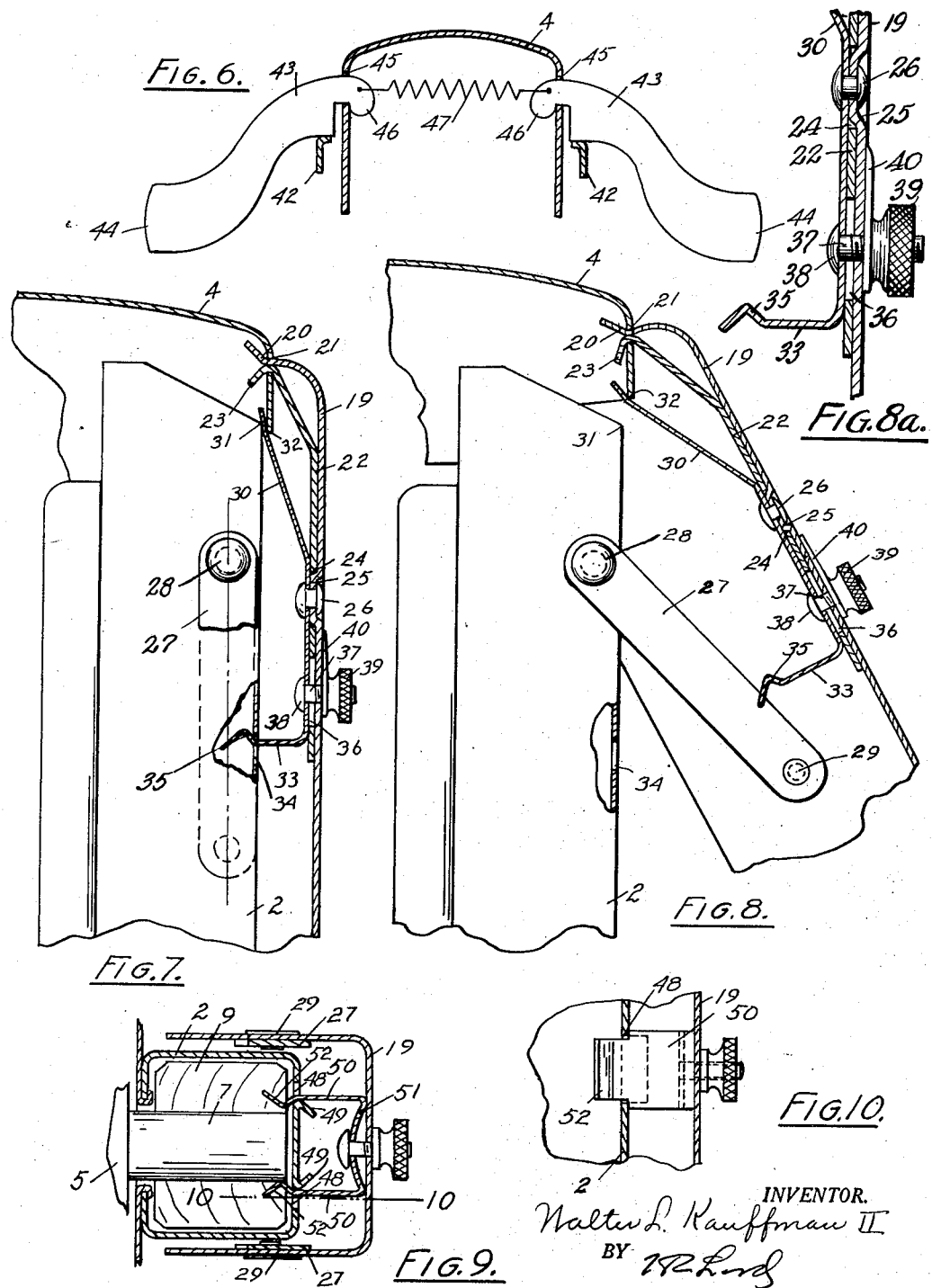
INVENTOR.
Walter L. Kauffman II
BY
ATTORNEYS.

Patented Feb. 25, 1941

2,233,387

UNITED STATES PATENT OFFICE 2,233,387

WRINGER

Walter L. Kauffman, II, Erie, Pa., assignor to Lovell Manufacturing Company, Erie, Pa., a corporation of Pennsylvania Application July 1, 1937, Serial No. 151,415

18 Claims. (Cl. 68—263)

Power wringers are usually provided with some safety appliance by means of which the pressure on the rolls may be instantly released in order to prevent injury to an operator when caught in the rolls. These devices for releasing pressure should be very sensitive so that they may operate under panic conditions with certainty and with little effort. On the other hand, it is desirable to have these devices so arranged that they will not accidentally release the pressure from the jar in the operation of the wringer. The pressure which is ordinarily sustained by the releasing devices is very heavy and this pressure or stress is increased by any abnormal separation of the rolls either by clothes or an operator's hand. This high pressure increases the frictional engagement of the releasing parts and consequently detracts from the sensitiveness of the device so as to register added effort.

In the present invention the sustaining members of the release device are arranged in unstable relation so that the pressure sustained urges a movement of the members to a release position and this urge is increased as the pressure is increased. By utilizing this unstable relation as counteracting or compensating for the added friction resisting movement toward release position, it is possible within reasonable limits to approximate a balanced condition between these forces so that the release mechanism will be substantially of the same sensitiveness throughout the various pressures to which it is subjected.

With a balanced condition it is desirable, however, to afford some sort of a locking means which will with reasonable certainty prevent an accidental release. The locking mechanism being directed merely to the locking action is relieved of the pressure, and thus presents a uniform resistance to release movement, so that it may be adjusted to a safe margin and still provide a comparatively small resistance to the release effort.

It is also desirable to form guiding means by which a movable top bar may be more definitely guided to position as it is assembled on the stiles of the wringer.

Further features and details will appear from the specification and claims.

A preferred embodiment of the invention is illustrated in the accompanying drawings as follows:

Fig. 1 shows a front elevation of a wringer partly in section.

Fig. 2 an end view of the wringer.

Fig. 3 a plan view of the wringer.

Fig. 4 a section on the line 4—4 in Fig. 1.

Fig. 5 an inside view of the resetting and release lever with attached parts.

Fig. 6 a section on the line 6—6 in Fig. 1.

Fig. 7 an enlarged section of the release end of the wringer with the parts in set position.

Fig. 8 a similar view with the parts in release position.

Fig. 8a an enlarged view of a portion of the releasing structure.

Fig. 9 a horizontal section showing an alternative lock structure.

Fig. 10 a section on the line 10—10 in Fig. 9.

1 marks the base of the wringer frame, 2 the stile at the release end of the wringer, 3 the stile at the opposite end of the wringer, 4 a detachable top bar, 5 and 6 lower and upper rolls respectively, 7 and 8 the shafts for the lower and upper rolls respectively, 9 bearings for the lower shaft, these bearings being arranged in the stiles and supported by brackets 10. 11 marks the bearings for the upper shaft, these bearings being slidingly mounted in the stiles. 12 marks a pressure spring, 13 an adjusting screw for the pressure spring, 14 a nut secured in the top bar in which the screw 13 operates.

Initially the end of the top bar opposite the release end of the wringer has an interlocking engagement with the stile, the top bar being provided with a stabbing 15 providing a shoulder 16 and the stile being provided with a stabbing 17 providing a shoulder 18 for engaging the shoulder 16. In this way this end of the top bar is secured to the stile.

The releasing end of the top bar is secured to the stile through a safety release mechanism through which the pressure on the rolls may be instantly released. A release and resetting lever 19 has a hooked end 20' which extends through an opening 21 in the top stile. A plate 22 having a hooked end 23 also extends through the opening 21. This plate 22 has an opening 24 into which a detent 25 formed in the wall of the lever extends. The plate 22 and lever 19 are secured in this assembly by a rivet 26.

This structure forms a very cheaply constructed hinge making the pivotal connection between the lever and the top bar. The load on the lever, particularly at the hook is sustained by the plate 22. By this means the hook may be formed of material of adequate thickness and still permit the use of comparatively thin material for the lever 19. Preferably the lever 19 is of channel form closing on the sides of the stile.

Links 27 are pivotally connected at 29 with the sides of the lever 19 and these links are pivotally connected at 28 with the side stiles. The link, its pivots, and the lever 19 and its hinge or pivot are so related that when the lever is in its lower position the links are very nearly in line when the top bar is in set position. Preferably the pivots 29, 28 and the pivot formed by the hook 23 are very slightly off line in a direction toward a release movement, this relation rendering these members unstable under the pressure of the spring. This unstable condition urges a movement toward release which increases as the pressure on the pressure device due to the separation of the rolls increases. At the same time the frictional resistance of these pivots to movement is also present and resisting movement, and this frictional resistance increases as the load on the pressure device increases. The unstable relation may be set, therefore, by positioning the pivots so as to approximately balance the frictional resistance of the joints. In this way the pressure effect of the pressure device on the release mechanism may be neutralized.

In order to retain the release mechanism with certainty in set position with these other forces approximately neutralized, I prefer to provide yielding locking means. As one of these means, a resilient plate 30 has its upper end extending between the upper outside edge 31 of the stile and the lower inside edge 32 of the top bar. This plate is secured with the plate 22 by means of the rivet 26 and is tensioned to yieldingly draw the lever 19 inwardly by reason of the engagement at the upper end of the spring with the inside of the top bar. This plate 30 extending as it does into the inside of the top bar operates as a guide to assist the top bar in its movement over the end of the stile as the top bar is moved into position.

As an alternative or supplementing the spring 30, I prefer to provide a yielding lock for the lever. This is provided in the structure shown in Fig. 1 by extending the plate 30 and providing an inwardly extending member 33. This member 33 with the lever in set position passes through an opening 34 and is provided with a hook 35 having an inclined surface which engages the upper edge of the opening 34 and thus yieldingly locks the lever in set position. In order that the resistance of this lock may be adjusted I prefer to provide the following mechanism: The plate 22 is extended downwardly on the inside of the lever 19 and is provided with an opening 36 over which the lower end of the plate 30 extends. A screw 37 having a comparatively small head 38 passes through the plate and the opening 36, and a nut 39 is provided for exerting pressure on the screw. As the screw is tightened the plate is drawn inwardly thus tilting the lower end with the member 33 upwardly and increasing the lock in engagement of the hook 35. In order that this adjustment may be definitely indicated I prefer to provide a scale 41 on the outer face of the lever 19 and to provide a pointer 40 on the screw, the pointer traversing the scale and indicating the screw adjustment.

The trip mechanism is as follows: Arms 42 extend inwardly from the sides of the upper end of the lever 19. These arms are in the path of the levers 43 on the trip bar 44 so that a downward movement of the trip bar will through the engagement of the levers on the arms 42 forcibly move the lever 19 outwardly overcoming the yielding resistance to such movement. As soon as the lever 19 is moved a short distance the positioning of the pivots is so changed that the pressure of the spring 12 swings it to full release position. The levers 43 extend through notches or openings 45 in the front and rear face of the top bar. The levers have the hooked ends 46 tending to secure them in the openings 45 and springs 47 hold the levers in assembly.

In the operation of the wringer the top bar is engaged through the interlocking shoulders at one end and the opposite end is forced down by swinging the lever 19 downwardly to set position. As the lever reaches this set position the locking devices operate to retain it in set position but it will be understood that when the lever reaches the set position the toggle pivots are very nearly in alignment so that the slight unstable condition produced by the failure to align is resisted by the friction of the pivots.

In the alternative construction shown in Figs. 9 and 10 separate lower locking plates 50 are provided. These plates are connected through a cross plate 51 preferably arched. The plates 50 are provided with the inclined hooks 52 which pass through openings 48 in the side stile and engage the inner wall of the stile. As the openings 48 are formed, inclined shoulders 49 are provided which assist in the setting movement of the hooks 52 into the openings. Otherwise this structure of the modification is similar to that of Fig. 1.

What I claim as new is:

1. In a wringer having a frame; rolls mounted in the frame; a separable top bar; a pressure means exerting pressure on the rolls from the top bar; and a safety release device operating on the top bar comprising a toggle having a link pivotally connected to the top bar and a link pivotally connected to the frame, said links having their pivots related to render the toggle unstable in set position, the friction of the pivots of the links and the urge toward release of the unstable links being opposed to each other; a tripping means acting on one of the links and constructed and arranged to force the links toward releasing movement; and a lock yieldingly opposed to the force of the pressure device through the unstable toggle normally holding the toggle in set position.

2. In a wringer having a frame comprising a base and side stiles; rolls mounted in the frame; a separable top bar of channel form with closed ends assembled on the frame by telescopic action; a spring exerting pressure on the rolls from the top bar; and a guide plate extending within the top bar between an end of the top bar and the adjacent upper end of the outer face of the stile guiding the end of the top bar over the stile.

3. In a wringer having a frame comprising a base and side stiles; rolls mounted in the frame; a separable top bar of channel form with closed ends assembled by telescopic movement over the stiles; a spring exerting pressure from the top bar to the rolls; and a toggle connection between the top bar and the frame, one link of the toggle being pivotally connected to the top bar and the other link pivotally connected to the frame, one of the links carrying a guide plate extending between the end of the top bar to which the toggle is attached and the upper end of the outer face of the adjacent stile and guiding the top bar into position on the stile.

4. In a wringer having a frame comprising a base and side stiles; rolls mounted in the frame;

a separable top bar of channel form with closed ends assembled by telescopic movement over the stiles; a spring exerting pressure from the top bar to the rolls; and a toggle connection between the top bar and the frame, one link of the toggle being pivotally connected to the top bar and the other link pivotally connected to the frame, one of the links carrying a guide plate extending between the end of the top bar to which the toggle is attached and the upper end of the outer face of the adjacent stile and guiding the top bar into position on the stile, said guide plate being resilient and tensioned to exert pressure tending to hold the toggle toward the side stile.

5. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said parts having an unstable relation with the mechanism in set position, the frictional resistance to releasing movement and the urge to movement from the unstable relation being opposed to each other and both increasing with an increase of pressure on the retaining mechanism; a holding means constructed and arranged to yieldingly oppose and normally prevent movement of the pressure retaining mechanism from set position; and a tripping means acting on the mechanism forcing a release movement against the resistance of the holding means.

6. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said parts having an unstable relation with the mechanism in set position, the frictional resistance to releasing movement and the urge to movement from the unstable relation being opposed to each other and approximately balanced, and both increasing with an increase of pressure on the retaining mechanism; a holding means constructed and arranged to yieldingly oppose and normally prevent movement of the pressure retaining mechanism from set position; and a tripping means acting on the mechanism forcing a release movement against the resistance of the holding means.

7. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said parts having an unstable relation with the mechanism in set position, the frictional resistance to releasing movement and the urge to movement from the unstable relation being opposed to each other and both increasing with an increase of pressure on the retaining mechanism; a lock constructed and arranged to yieldingly oppose and normally prevent movement of the pressure retaining mechanism from set position; and a tripping means acting on the mechanism forcing a release movement against the resistance of the yielding lock.

8. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said parts having an unstable relation with the mechanism in set position, the frictional resistance to releasing movement and the urge to movement from the unstable relation being opposed to each other and both increasing with an increase of pressure on the retaining mechanism; a lock constructed and arranged to yieldingly oppose and normally prevent movement of the pressure retaining mechanism from set position; a tripping means acting on the mechanism forcing a release movement against the resistance of the yielding lock; and means adjusting the lock to vary the resistance to release.

9. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional enagement, said mechanism comprising a toggle having pivoted links receiving the pressure with their pivots related to place the links in unstable relation, the frictional resistance to releasing movement and the urge to movement from the unstable relation being opposed to each other and both increasing with an increase of pressure on the retaining mechanism; a holding means constructed and arranged to yieldingly oppose and normally prevent movement of the pressure retaining mechanism from set position; and a tripping means acting on the mechanism forcing a release movement against the resistance of the holding means.

10. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said mechanism comprising a toggle having pivoted links receiving the pressure with their pivots related to place the links in unstable relation, one of the links of the toggle forming a lever adapted to actuate the toggle for resetting the pressure on the pressure means, the frictional resistance to releasing movement and the urge to movement from the unstable relation being opposed to each other and both increasing with an increase of pressure on the retaining mechanism; a holding means constructed and arranged to yieldingly oppose and normally prevent movement of the lever from set position; and a tripping means acting on the mechanism forcing a release movement against the resistance of the holding means.

11. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said mechanism comprising a toggle having pivoted links receiving the pressure with their pivots related to place the links in unstable relation, the frictional resistance to releasing movement and the urge to movement from the unstable relation being opposed to each other and approximately balanced, and both increasing with an increase of pressure on the retaining mechanism; a holding means constructed and arranged to yieldingly oppose and normally prevent movement of the pressure retaining mechanism from set position; and a tripping means acting on the mechanism forcing a release movement against the resistance of the holding means.

12. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said mechanism comprising a toggle having pivoted links receiving the pressure with their pivots related to place the links in unstable relation, the frictional resistance to releasing movement and the urge to movement from the unstable relation being opposed to each other and both increasing with an increase of pressure on the retaining mechanism; a lock constructed and arranged to yieldingly and normally retain the mechanism in set position; and a tripping means acting on the mechanism forcing a release movement against the resistance of the yielding lock.

13. In a wringer having a frame; rolls mounted in the frame; a separable top bar; and a pressure means exerting pressure on the rolls from the top bar; the combination with the pressure means of a safety release device operating on the top bar comprising retaining means for the top bar, said retaining means having pressure sustaining parts in frictional engagement and releasing the top bar by relative movement of the parts in frictional engagement, said parts having unstable relation with the mechanism under pressure, the frictional resistance to releasing movement and the urge to movement from the unstable relation being opposed to each other and both increasing with an increase of pressure on the retaining mechanism; a holding means constructed and arranged to yieldingly oppose and normally prevent movement of the retaining mechanism from set position; and a tripping means acting on the mechanism forcing a release movement against the resistance of the holding means.

14. In a wringer having a frame; rolls mounted in the frame; a separable top bar; and a pressure means exerting pressure on the rolls from the top bar; the combination with the pressure means of a safety release device operating on the top bar comprising retaining means for the top bar, said retaining means having pressure sustaining parts in frictional engagement and releasing the top bar by relative movement of the parts in frictional engagement, said parts having unstable relation with the mechanism under pressure, the frictional resistance to releasing movement and the urge to movement from the unstable relation being opposed to each other and both increasing with an increase of pressure on the retaining mechanism; a lock constructed and arranged to yieldingly and normally retain the mechanism in set position; and a tripping means acting on the mechanism forcing a release movement against the resistance of the yielding lock.

15. In a wringer having a frame; rolls mounted in the frame; a separable top bar; and a pressure means exerting pressure on the rolls from the top bar; the combination with the pressure means of a safety release device operating on the top bar comprising pressure retaining mechanism having pressure sustaining parts in frictional engagement releasing the means by relative movement of the parts of the mechanism in frictional engagement, said mechanism comprising a toggle having a link pivotally connected to the top bar and a link pivotally connected to the frame, said links with their pivots related to place the links in unstable relation, the frictional resistance to releasing movement and the urge to movement from the unstable relation being opposed to each other and both increasing with an increase of pressure on the retaining mechanism; a holding means constructed and arranged to yieldingly oppose and normally prevent movement of the pressure retaining mechanism from set position; and a tripping means acting on the mechanism forcing a release movement against the resistance of the holding means.

16. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said parts having an unstable relation with the mechanism in set position, the frictional resistance to releasing movement and the urge to movement from the unstable relation being opposed to each other and both increasing with an increase of pressure on the retaining mechanism; a spring constructed and arranged to yieldingly oppose and normally prevent movement of the pressure retaining mechanism from set position; and a tripping means acting on the mechanism forcing a release movement against the resistance of the spring.

17. In a wringer having a frame; rolls mounted in the frame; and pressure means exerting pressure on the rolls; the combination with the pressure means of a safety release device comprising pressure retaining mechanism having pressure sustaining parts in frictional engagement releasing the means by relative movement of the parts of the mechanism in frictional engagement, said mechanism comprising a toggle having pivoted links receiving the pressure with their pivots related to place the links in unstable relation, the frictional resistance to releasing movement and the urge to movement from the unstable relation being opposed to each other and both increasing with an increase of pressure on the retaining mechanism; a holding spring constructed and arranged to yieldingly and normally retain the mechanism in set position; and a tripping means acting on the mechanism forcing a release movement against the resistance of the holding spring.

18. In a wringer having a frame; rolls mounted in the frame; a separable top bar; and a pressure means exerting pressure on the rolls from the top bar; the combination with the pressure means of a safety release device operating on the top bar comprising retaining means for the top bar, said retaining means having pressure sustaining parts in frictional engagement and releasing the top bar by relative movement of the parts in frictional engagement, said parts having unstable relation with the mechanism under pressure, the frictional resistance to releasing movement and the urge to movement from the unstable relation being opposed to each other and both increasing with an increase of pressure on the retaining mechanism; a holding spring constructed and arranged to yieldingly and normally retain the mechanism in set position; and a tripping means acting on the mechanism forcing a release movement against the resistance of the holding spring.

WALTER L. KAUFFMAN, II.